(12) United States Patent
Shibuya et al.

(10) Patent No.: US 10,773,141 B2
(45) Date of Patent: Sep. 15, 2020

(54) EXERCISE ANALYZING DEVICE, EXERCISE ANALYZING SYSTEM, AND EXERCISE ANALYZING METHOD

(71) Applicant: SEIKO EPSON CORPORATION, Tokyo (JP)

(72) Inventors: Kazuhiro Shibuya, Shiojiri (JP); Takuya Hiraide, Okaya (JP); Masaki Ukawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 404 days.

(21) Appl. No.: 15/916,838

(22) Filed: Mar. 9, 2018

(65) Prior Publication Data

US 2018/0272209 A1  Sep. 27, 2018

(30) Foreign Application Priority Data

Mar. 23, 2017  (JP) .................. 2017-057156

(51) Int. Cl.
*A63B 60/46* (2015.01)
*G06F 3/01* (2006.01)
*A63B 69/36* (2006.01)
*G06F 3/0346* (2013.01)

(52) U.S. Cl.
CPC .......... *A63B 60/46* (2015.10); *A63B 69/3632* (2013.01); *G06F 3/014* (2013.01); *G06F 3/017* (2013.01); *G06F 3/0346* (2013.01); *A63B 2060/464* (2015.10)

(58) Field of Classification Search
CPC ........ G06F 3/017; G06F 3/0346; G06F 3/014; A63B 60/46; A63B 69/3632
See application file for complete search history.

(56) References Cited

U.S. PATENT DOCUMENTS

| 8,672,779 B1 | 3/2014 | Sakyo et al. | |
| 2012/0196693 A1* | 8/2012 | Takasugi | G09B 19/0038 473/221 |
| 2012/0209532 A1* | 8/2012 | Liang | G06F 19/3481 702/19 |
| 2015/0119158 A1* | 4/2015 | Sato | A63B 69/3632 473/223 |

FOREIGN PATENT DOCUMENTS

| JP | 2008-073210 A | 4/2008 |
| JP | 2014-100341 A | 6/2014 |
| JP | 2017-056215 A | 3/2017 |

* cited by examiner

*Primary Examiner* — Regis J Betsch
*Assistant Examiner* — Jeremy A Delozier
(74) *Attorney, Agent, or Firm* — Oliff PLC

(57) ABSTRACT

An exercise analyzing device (a swing analyzing device) includes an acquiring section (a data acquiring section) configured to acquire an output of a first inertial sensor (an acceleration sensor and an angular velocity sensor) attached to a body of a user and an output of a second inertial sensor (an acceleration sensor and an angular velocity sensor) attached to an exercise instrument (a golf club), an analyzing section (a swing analyzing section) configured to analyze a correlation or a similarity degree between the output of the first inertial sensor and the output of the second inertial sensor and generate reference information, and an output processing section configured to estimate, when the second inertial sensor is not used, the output of the second inertial sensor from the output of the first inertial sensor and the reference information.

9 Claims, 9 Drawing Sheets

EXERCISE ANALYZING DEVICE, EXERCISE ANALYZING SYSTEM, AND EXERCISE ANALYZING METHOD

CROSS-REFERENCE TO RELATED APPLICATION

This application claims priority from Japanese patent application JP 2017-057156 filed Mar. 23, 2017, which is incorporated herein by reference in its entirety.

BACKGROUND

1. Technical Field

The present invention relates to an exercise analyzing device, an exercise analyzing system, and an exercise analyzing method.

2. Related Art

As an exercise analyzing device, there has been disclosed a device that detects (calculates), on the basis of measurement data measured by an inertial sensor such as an acceleration sensor attached to a golf club or the like, an indicator indicating a swing state of a player and analyzes a golf swing (see, for example, JP-A-2014-100341 (Patent Literature 1)).

However, when a user plays a round in a golf course or the like, the user uses a plurality of golf clubs. Therefor, the user needs to attach exercise analyzing devices to the respective golf clubs or replace an exercise analyzing device every time the user changes a golf club. This reduces convenience, in other words, convenience of use for the user.

SUMMARY

An advantage of some aspects of the invention is to solve at least a part of the problems, and the invention can be implemented as the following forms or application examples.

APPLICATION EXAMPLE 1

An exercise analyzing device according to this application example includes: an acquiring section configured to acquire an output of a first inertial sensor attached to a user and an output of a second inertial sensor attached to an exercise instrument; an analyzing section configured to analyze a correlation or a similarity degree between the output of the first inertial sensor and the output of the second inertial sensor and generate reference information; and an output processing section configured to estimate, when the second inertial sensor is not used, the output of the second inertial sensor from the output of the first inertial sensor and the reference information.

With the exercise analyzing device in this application example, the analyzing section generates reference information obtained by analyzing a correlation or a similarity degree between an output of the first inertial sensor attached to the user and an output of the second inertial sensor attached to the exercise instrument, the outputs being acquired by the acquiring section during practice or the like. When the second inertial sensor is not used, the output processing section estimates, on the basis of an output of the first inertial sensor used at that time, an output of the second inertial sensor corresponding to the output of the first inertial sensor from the reference information during the practice and performs an analysis of exercise according to the estimated output of the second inertial sensor. Consequently, when the second inertial sensor is not used, for example, during golf round, even if the second inertial sensor is not attached to the exercise instrument (e.g., a golf club) or the like, it is possible to perform an exercise analysis (e.g., a swing analysis) with relatively high accuracy according to the estimated output of the second inertial sensor. It is possible to improve convenience, that is, convenience of use for the user.

APPLICATION EXAMPLE 2

In the exercise analyzing device described in the application example, it is preferable that the analyzing section calculates an analysis value in a grip of the exercise instrument from each of the output of the first inertial sensor and the output of the second inertial sensor and generates the reference information from the analysis value.

According to this application example, it is possible to generate the reference information in the grip, which is a joint section of both of the body to which the first inertial sensor is attached and the exercise instrument (e.g., the golf club) to which the second inertial sensor is attached. Therefore, it is possible to perform a more highly accurate swing analysis.

APPLICATION EXAMPLE 3

In the exercise analyzing device described in the application example, it is preferable that the output processing section estimates an average of a plurality of kinds of the reference information as the output of the second inertial sensor.

According to this application example, the average of the plurality of kinds of reference information is assumed as the output of the second inertial sensor. Therefore, it is possible to improve accuracy of the swing analysis.

APPLICATION EXAMPLE 4

In the exercise analyzing device described in the application example, it is preferable that the exercise analyzing device includes an output section configured to output an exercise analysis result obtained by analyzing exercise on the basis of the output of the second inertial sensor assumed by the output processing section.

According to this application example, the exercise analysis result obtained by analyzing the exercise on the basis of the output of the second inertial sensor is output from the output section. Therefore, the user can easily grasp the exercise analysis result

APPLICATION EXAMPLE 5

An exercise analyzing system according to this application example includes: a wrist device attached to a user and including a first inertial sensor; a sensor unit attached to an exercise instrument and including a second inertial sensor; and an exercise analyzing device including: an acquiring section configured to acquire an output of the first inertial sensor and an output of the second inertial sensor; an analyzing section configured to analyze a correlation or a similarity degree between the output of the first inertial sensor and the output of the second inertial sensor and generate reference information; and an output processing section configured to estimate, when the sensor unit is not used, the output of the second inertial sensor from the output of the first inertial sensor and the reference information.

With the exercise analyzing system in this application example, the analyzing section included in the exercise analyzing device generates reference information obtained by analyzing a correlation or a similarity degree between an output of the first inertial sensor included in the wrist device attached to the user and an output of the second inertial sensor included in the sensor unit attached to the exercise instrument, the outputs being acquired by the acquiring section during practice. When the second inertial sensor (the sensor unit) is not used, the exercise analyzing device estimates, on the basis of an output of the first inertial sensor used at that time, an output of the second inertial sensor corresponding to the output of the first inertial sensor from the reference information during the practice and performs an analysis of exercise according to the estimated output of the second inertial sensor. Consequently, when the second inertial sensor is not used, for example, during golf round, even if the second inertial sensor is not attached to the exercise instrument (e.g., a golf club) or the like, it is possible to perform an exercise analysis (e.g., a swing analysis) with relatively high accuracy according to the estimated output of the second inertial sensor. It is possible to improve convenience, that is, convenience of use for the user.

APPLICATION EXAMPLE 6

An exercise analyzing system according to this application example includes: a sensor unit attached to an exercise instrument and including a second inertial sensor; and a wrist device attached to a user and including a first inertial sensor; an acquiring section configured to acquire an output of the first inertial sensor and an output of the second inertial sensor; an analyzing section configured to analyze a correlation or a similarity degree between the output of the first inertial sensor and the output of the second inertial sensor and generate reference information; and an output processing section configured to estimate, when the sensor unit is not used, the output of the second inertial sensor from the output of the first inertial sensor and the reference information.

With the exercise analyzing system in this application example, the analyzing section included in the wrist device generates reference information obtained by analyzing a correlation or a similarity degree between an output of the second inertial sensor included in the sensor unit attached to the exercise instrument and an output of the first inertial sensor included in the wrist device attached to the user, the outputs being acquired by the acquiring section, for example, during practice. When the second inertial sensor is not used, the exercise analyzing device estimates, on the basis of an output of the first inertial sensor used at that time, an output of the second inertial sensor corresponding to the output of the first inertial sensor from the reference information during the practice and performs an analysis of exercise according to the estimated output of the second inertial sensor. Consequently, when the second inertial sensor (the sensor unit) is not used, for example, during golf round, even if the second inertial sensor is not attached to the exercise instrument (e.g., a golf club) or the like, it is possible to perform an exercise analysis (e.g., a swing analysis) with relatively high accuracy according to the estimated output of the second inertial sensor. An exercise analysis (a swing analysis) can be performed in the wrist device. Therefore, the user can learn an analysis result only with the wrist device. It is possible to further improve the convenience, that is, the convenience of use.

APPLICATION EXAMPLE 7

In the exercise analyzing system described in the application example, it is preferable that the wrist device includes: an acquisition processing section configured to acquire the exercise analysis result; and a display configured to display the exercise analysis result acquired by the acquisition processing section.

According to this application example, the exercise analysis result acquired by the acquisition processing section is displayed on the display included in the wrist device. Therefore, the user can easily grasp the exercise analysis result.

APPLICATION EXAMPLE 8

An exercise analyzing method according to this application example includes: acquiring an output of a first inertial sensor attached to a user; acquiring reference information obtained by analyzing a correlation or a similarity degree between the output of the first inertial sensor and an output of a second inertial sensor attached to an exercise instrument; and estimating, when the second inertial sensor is not used, the output of the second inertial sensor from the output of the first inertial sensor and the reference information.

With the exercise analyzing method in this application example, reference information is acquired by analyzing a correlation or a similarity degree between an output of the second inertial sensor attached to the exercise instrument and an output of the first inertial sensor attached to the user, the outputs being acquired, for example, during practice. When the second inertial sensor is not used, on the basis of an output of the first inertial sensor used at that time, an output of the second inertial sensor corresponding to the output of the first inertial sensor is estimated from the reference information during the practice and an analysis of exercise is performed according to the estimated output of the second inertial sensor. Consequently, when the second inertial sensor is not used, for example, during golf round, even if the second inertial sensor is not attached to the exercise instrument (e.g., a golf club) or the like, it is possible to perform an exercise analysis (e.g., a swing analysis) with relatively high accuracy according to the output of the second inertial sensor estimated from the output of the first inertial sensor. The user can learn an analysis result only with the first inertial sensor attached to the user. It is possible to further improve the convenience, that is, the convenience of use.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention are explained in detail below with reference to the drawings. Note that the embodiments explained below do not unduly limit the contents of the invention described in the appended claims. Not all of components explained below are essential constituent elements of the invention.

First Embodiment 1-1. Configuration of an Exercise Analyzing System

Figure 1:
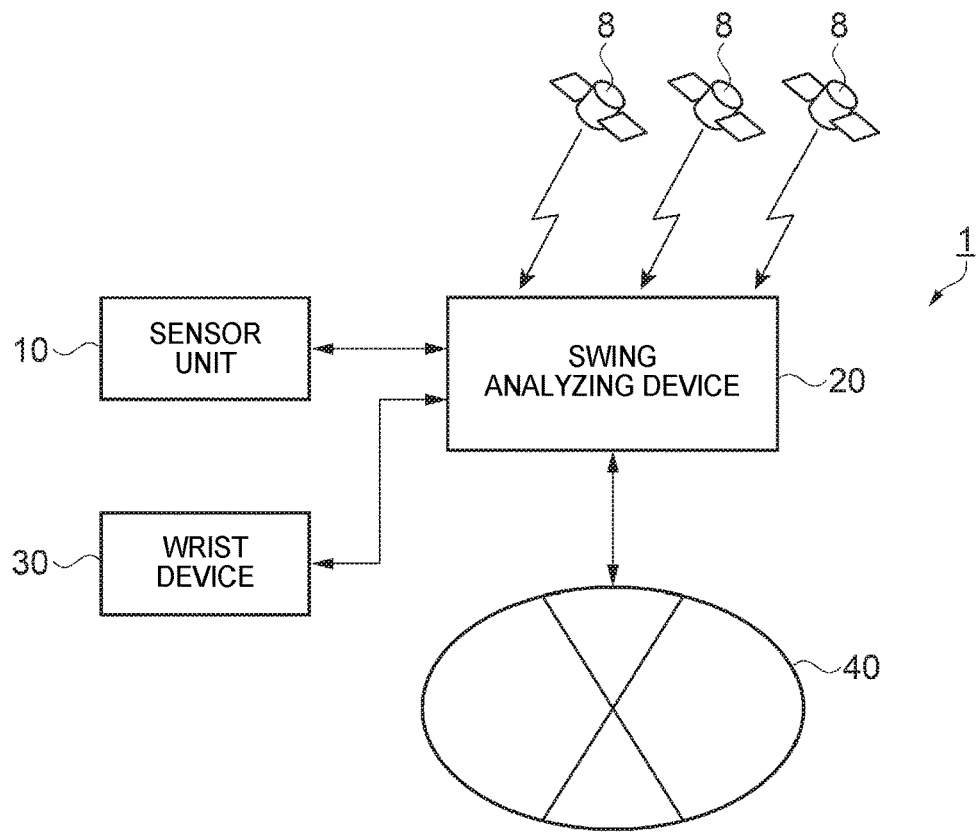
FIG. 1 is a diagram showing a configuration example of an exercise analyzing system according to a first embodiment.
Figure 2:
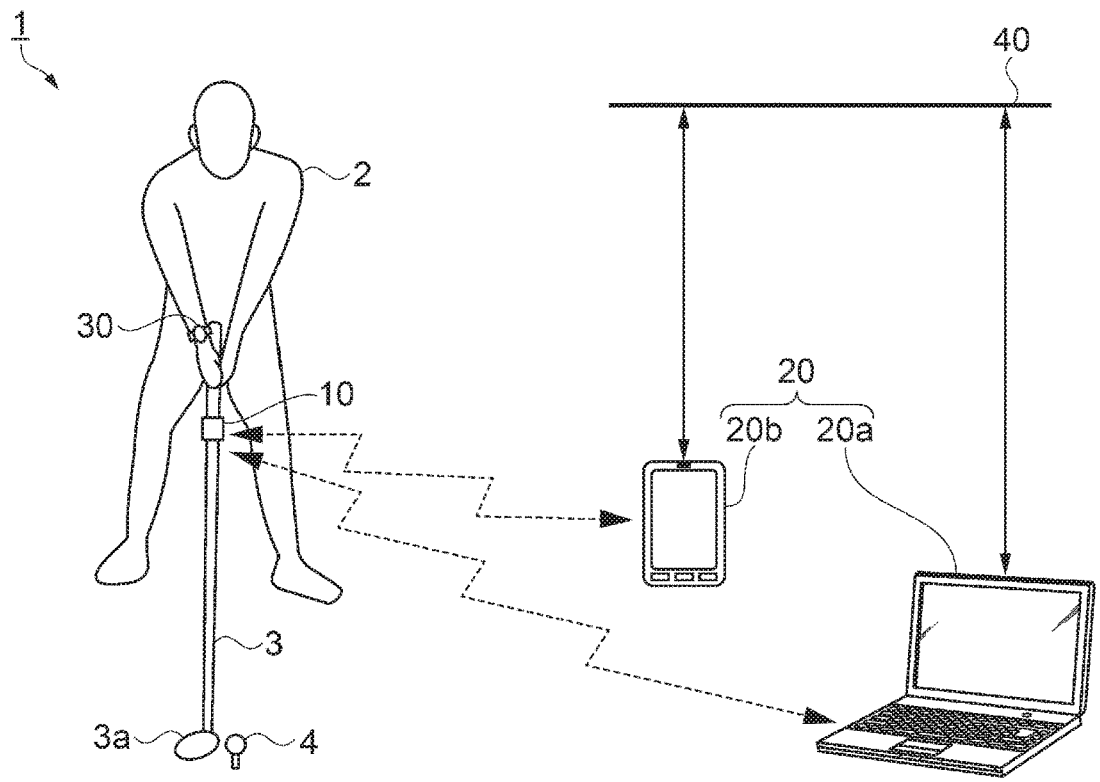
FIG. 2 is a diagram showing a disposition example of a sensor unit functioning as an exercise measuring device, a swing analyzing device functioning as an exercise analyzing device, and a wrist device according to the first embodiment.
Figure 3:
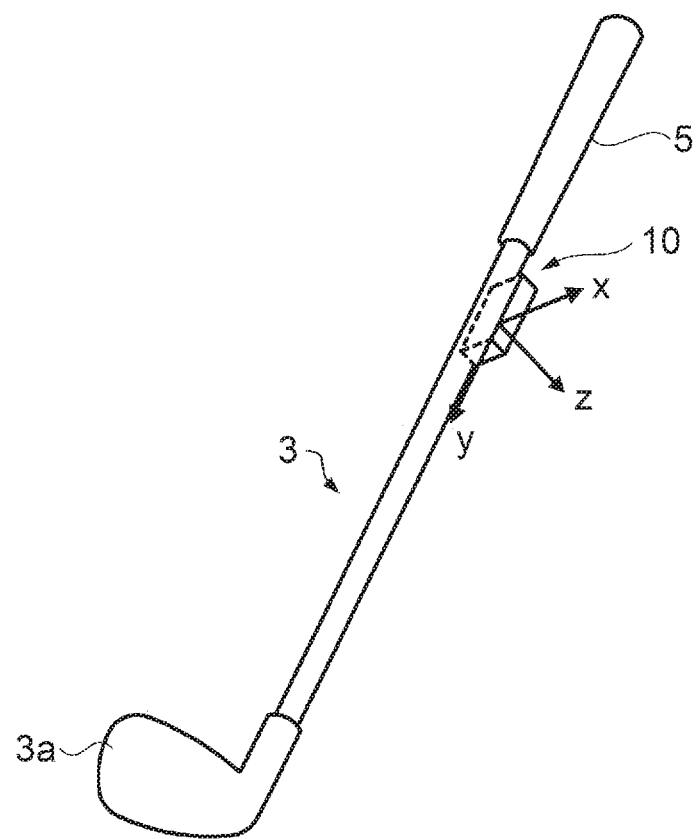
FIG. 3 is a diagram showing an example of an attachment position and a direction of the sensor unit.

An exercise analyzing system (an exercise measuring device and an exercise analyzing device) according to a first embodiment is explained with reference to FIGS. 1 to 3 and with reference to, as an example of exercise measurement and an exercise analysis, measurement and an analysis of a swing of golf (hereinafter referred to as golf swing). FIG. 1 is a diagram showing a configuration example of the exercise analyzing system according to the first embodiment. FIG. 2 is a diagram showing a disposition example of a sensor unit functioning as an exercise measuring device, a swing analyzing device functioning as an exercise analyzing device, and a wrist device functioning as an exercise measuring device according to the first embodiment. FIG. 3 is a diagram showing an example of an attachment position and a direction of the sensor unit.

As shown in FIG. 1, an exercise analyzing system 1 in the first embodiment includes a sensor unit (including a second inertial sensor) 10 functioning as an exercise measuring device attached to an exercise instrument (a golf club), a swing analyzing device 20 functioning as an exercise analyzing device including a swing diagnosing device (not shown in FIG. 1), and a wrist device 30 (an example of a motion sensor including a first inertial sensor) functioning as an exercise measuring device attached to a body such as a wrist of a user. Note that, as shown in FIG. 1, the exercise analyzing system 1 includes GPS satellites (position-information output sections) 8 and a position-information acquiring section 43 (see FIG. 6) included in the swing analyzing device 20. The swing analyzing system 1 can include a function of receiving information related to positions included in radio waves (satellite signals) transmitted from the GPS satellites 8 and performing positioning calculation (acquisition of position information). Communication between the sensor unit 10 and the swing analyzing device 20 may be wireless communication or may be wired communication. As shown in FIG. 2, the swing analyzing device 20 is realized by, besides a personal computer 20a, a portable device 20b such as a smartphone or a tablet or various information terminals (client terminals) including wearable terminals such as a head mounted display (HMD) and a wrist device.

However, the exercise analyzing system 1 may include a not-shown swing diagnosing device separately from the swing analyzing device 20. The swing diagnosing device in that case may be realized by a server that processes a request from the swing analyzing device 20. The swing analyzing device 20 and the swing diagnosing device may be connected via a network 40. The network 40 may be a wide area network (WAN) such as the Internet or may be a local area network (LAN). Alternatively, the swing analyzing device 20 and the swing diagnosing device may communicate through, for example, short-range wireless communication or wired communication not via the network 40. Processing performed by the swing analyzing device 20 may be realized by a server. In that case, the sensor unit 10 and the wrist device 30 are connected to the network 40. A result of the analysis by the server may be received and displayed by the wrist device 30 and the like.

The sensor unit 10 is capable of measuring, for example, accelerations in respective axis direction of three axes orthogonal to one another, angular velocities around the respective three axes orthogonal to one another, and an azimuth (a direction) in which the sensor unit 10 faces. As shown in FIG. 2, the sensor unit 10 is attached to, for example, a golf club 3 functioning as an exercise instrument. The swing analyzing device 20 can calculate, on the basis of an output of the sensor unit 10, a state of a user 2 as movement information (position information) such as "moving" in which the user 2 is moving toward the next shot position in a round or "stopping" or "movement stopped" in which the user 2 stops to perform a swing (a shot).

For example, as shown in FIG. 3, the sensor unit 10 is attached to the golf club (an example of an exercise instrument) 3 with three detection axes (an x axis, a y axis, and a z axis) crossing (ideally, orthogonal to) one another adjusted. In FIG. 3, the sensor unit 10 is attached to a part of a shaft, for example, with the y axis adjusted to a longitudinal direction of the shaft of the golf club 3 (a longitudinal direction of the golf club 3) and with the x axis adjusted to a target direction of ball hitting (a shot target direction). Desirably, the sensor unit 10 is attached to a position close to a grip 5 to which a shock during ball hitting is less easily transmitted and a centrifugal force is less easily applied during a swing. The shaft is a portion of a handle excluding a head (a hitting section) 3a of the golf club 3 and includes the grip 5 gripped by the user 2.

The user 2 performs a swing motion for hitting (shooting) a golf ball 4 with the golf club 3 or a swing motion by a practice swing according to a predetermined procedure. Note that the swing motion is, for example, a swing motion performed in a practice range or a swing motion during round in a golf course. When the user 2 plays round in a golf course or the like, the user 2 uses a plurality of clubs (e.g., the golf club 3). Therefor, the user 2 needs to attach sensor units 10 to the respective clubs or replace an exercise analyzing device every time the user 2 changes a club. Convenience of use for the user 2 is poor. Therefore, in this embodiment, in the practice range, the user 2 attaches the sensor unit 10 to the golf club 3 and attaches the wrist device 30 explained below to the body (e.g., the wrist) of the user 2. During the round, the user 2 does not attach the sensor unit 10 to the club (the golf club 3) and attaches the wrist device 30 to the body (e.g., the wrist) of the user 2 and performs a swing.

Although details are explained below, schematically explained, in the practice range, the user 2 attaches the sensor unit 10 to the golf club 3 and attaches the wrist device 30 explained below to the body (e.g., the wrist) of the user 2. Thereafter, the user 2 performs a swing of the golf club 3, whereby outputs of an acceleration sensor 12 and an angular velocity sensor 14 functioning as a second inertial sensor included in the sensor unit 10 and outputs of an acceleration sensor 32 and an angular velocity sensor 33 functioning as a first inertial sensor included in the wrist device 30 are acquired. Reference information 241 (see FIG. 6) is generated as information obtained by analyzing a correlation or a similarity degree between the acquired outputs of the second inertial sensor (the acceleration sensor 12 and the angular velocity sensor 14) and the acquired outputs of the first inertial sensor (the acceleration sensor 32 and the angular velocity sensor 33) and is saved (stored). During the round in the golf course, the user 2 does not attach the sensor unit 10 to the golf club 3, attaches the wrist device 30 explained below to the body (e.g., the wrist) of the user 2, and acquires, with a swing of the golf club 3, outputs of the acceleration sensor 32 and the angular velocity sensor 33 functioning as the first inertial sensor included in the wrist device 30. The user 2 estimates, from the reference information 241 during the practice, on the basis of the acquired outputs of the acceleration sensor 32 and the angular velocity sensor 33, not-measured outputs of the acceleration sensor 12 and the angular velocity sensor 14 of the sensor unit 10, which is originally attached to the golf club 3 and performs measurement, and performs an analysis of the swing. Note that "the sensor unit 10 is not attached to the golf club 3" is equivalent to "the second inertial sensor (the acceleration sensor 12 and the angular velocity sensor 14) is not used".

Figure 4:
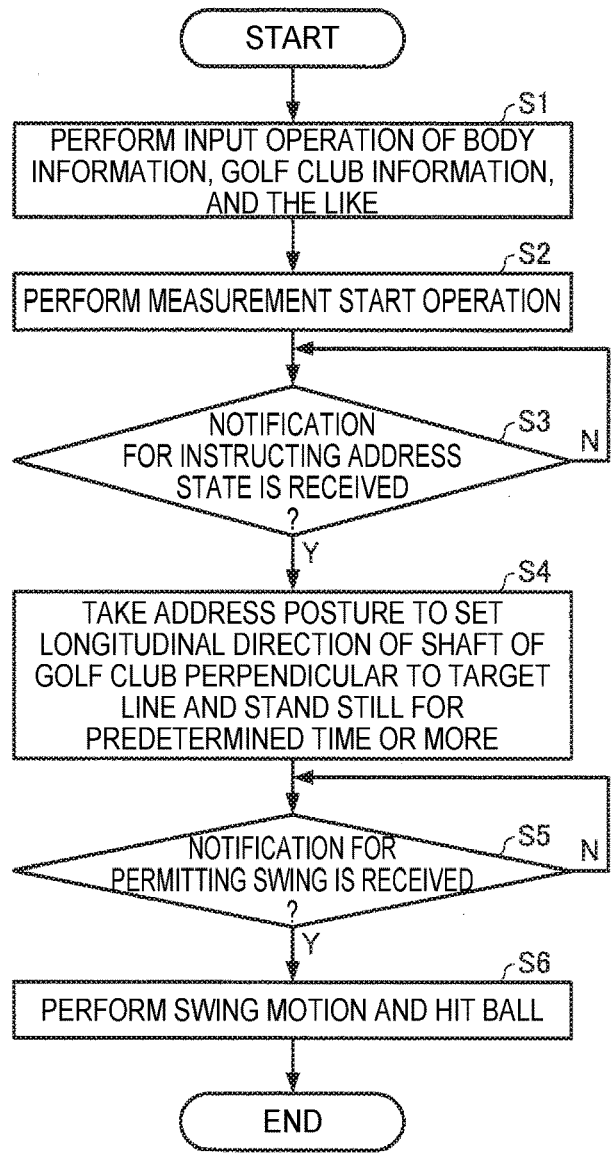
FIG. 4 is a diagram showing a procedure of motions performed by a user until the user hits a ball.

FIG. 4 is a diagram showing a procedure of motions performed by the user 2 until the user 2 hits a ball in this embodiment. Note that the procedure of the motions shown in FIG. 4 is a swing motion performed in a practice range or a swing motion during round in a golf course. In the following explanation, a swing performed in the practice range is explained as an example. However, in the procedure during the round, since the sensor unit 10 is not used, only the wrist device 30 is used.

First, prior to a swing, the user 2 attaches the wrist device 30 to the wrist of the user 2 and attaches the sensor unit 10 to a predetermined position of the golf club 3. As shown in FIG. 4, the user 2 performs, via the swing analyzing device 20, input operation for inputting information related to the body of the user 2, information concerning the golf club 3 used by the user 2 (golf club information), and the like (S1).

In step S1 in FIG. 4, the user 2 inputs information related to the body such as height, sex, an age, and a country and inputs information concerning the golf club 3 such as a club length (the length of a shaft) and a number on an input screen (not shown in FIG. 4). Note that the information related to the body is not limited to the above and may include, for example, information concerning at least one of the length of arms and the length of legs instead of or together with the height. Similarly, the information included in the information concerning the golf club 3 is not limited to the above. For example, the golf club information may not include the information concerning either one of the club length and the number or may include other information.

Subsequently, the user 2 performs measurement start operation (operation for causing the sensor unit 10 to start measurement) via the swing analyzing device 20 (S2). After receiving, from the swing analyzing device 20, a notification (e.g., a notification by voice) for instructing the user 2 to take an address posture (a basic posture before a swing start) (Y in S3), the user 2 takes the address posture to set the longitudinal direction of the shaft of the golf club 3 to be perpendicular to a target line (a target direction of ball hitting) and stands still for a predetermined time or more (S4). Subsequently, after receiving, from the swing analyzing device 20, a notification (e.g., a notification by voice) for permitting a swing (Y in S5), the user 2 performs a swing motion and hits the golf ball 4 (S6). Note that this embodiment is not always limited to the ball hitting and can also be applied to a practice swing. This embodiment may include a function of detecting timing equivalent to the ball hitting.

When the user 2 performs the measurement start operation in step S2 in FIG. 4, the swing analyzing device 20 transmits a measurement start command to the sensor unit 10 and the wrist device 30. The sensor unit 10 and the wrist device 30 receive the measurement start command and start measurement of three-axis accelerations and three-axis angular velocities in the respective inertial sensors (the acceleration sensors 12 and 32 and the angular velocity sensors 14 and 33). The sensor unit 10 and the wrist device 30 measure three-axis accelerations and three-axis angular velocities at a predetermined measurement sampling rate (e.g., 1 kHz, in other words, a predetermined cycle of 1 ms) and sequentially transmit measured data to the swing analyzing device 20.

The swing analyzing device 20 notifies the permission of the swing start in step S5 in FIG. 4 to the user 2. Thereafter, the swing analyzing device 20 analyzes, on the basis of the measurement data of the sensor unit 10 and the wrist device 30, the swing motion of the ball hitting performed by the user 2 using the golf club 3 (step S6 in FIG. 4).

Figure 5:
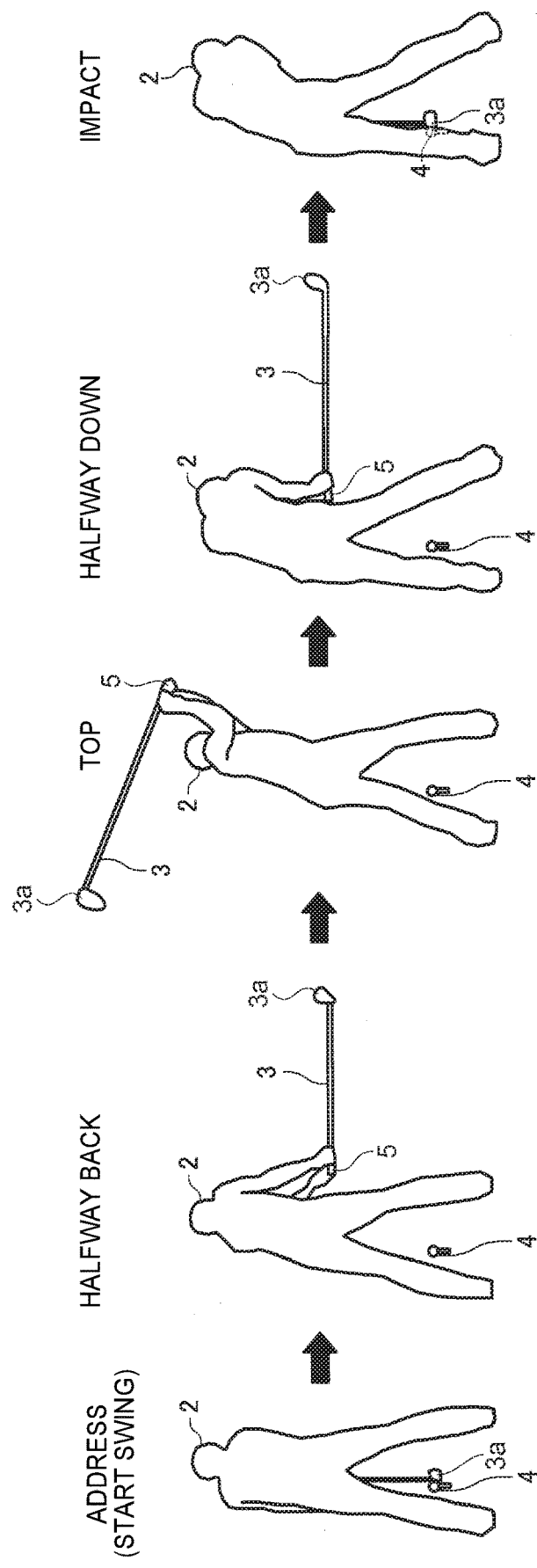
FIG. 5 is an explanatory diagram about a swing motion.

As shown in FIG. 5, the swing operation performed by the user 2 in step S6 in FIG. 4 includes a motion of leading to, after starting a swing (a back swing) from an address posture (a standstill state) in a state in which the user 2 grips the grip 5 of the golf club 3, an impact (ball hitting) for hitting the golf ball 4 through respective states of a halfway back in which the shaft of the golf club 3 is leveled during the back swing, a top in which the back swing is switched to a down swing, and a halfway down in which the shaft of the golf club 3 is leveled during the down swing. The swing analyzing device 20 generates swing analysis data including information concerning time (date and time) when the swing is performed, identification information and sex of the user 2, a type of the golf club 3, and an analysis result of the swing motion and saves the swing analysis data.

At this time, the swing analyzing device 20 generates and stores the reference information 241 (see FIG. 6) serving as information obtained by analyzing a correlation or a similarity degree between outputs of the acceleration sensor 12 and the angular velocity sensor 14 functioning as the second inertial sensor included in the sensor unit 10 and outputs of the acceleration sensor 32 and the angular velocity sensor 33 functioning as the first inertial sensor included in the wrist device 30. The swing analyzing device 20 saves (stores) the swing analysis data and the reference information 241 every time the user 2 performs the swing motion according to the procedure shown in FIG. 4. A swing analysis data list and a reference information list are constructed.

In this embodiment, when the user 2 starts a swing diagnosis application via an operation section 23 (see FIG. 6) of the swing analyzing device 20, a selection screen (not shown in FIG. 6) for the swing analysis data is displayed on a display 25 (see FIG. 6) of the swing analyzing device 20. The selection screen includes, about the respective swing analysis data of the user 2 included in the saved swing analysis data list, time (date and time), a type of the golf club 3 used by the user 2, and values of a part of indicators serving as an analysis result of the swing.

The selection screen includes checkboxes associated with the respective swing analysis data. The user 2 checks any one of the checkboxes via operation of the swing analyzing device 20, whereby, for example, an input data editing screen (not shown in FIG. 6), which is a target of swing diagnosis, is displayed on the display 25 of the swing analyzing device 20. Note that the input data editing screen includes, concerning sex, a type of the golf club 3 (a driver or an iron), and indicators of a swing, as initial values, values obtained on the basis of selected swing analysis data.

Input data including the sex, the type of the golf club 3, and the indicator values on the input data editing screen can be edited. The user 2 can edit the input data via the operation section 23 (see FIG. 6) of the swing analyzing device 20. The user 2 can input, for example, a score of golf for each of holes as the input data input from the input data editing screen.

The swing analyzing device 20 receives the input data (an input result) and calculates levels of a plurality of items using the input data. For example, the swing analyzing device 20 may calculate levels respectively about items of "a V zone", "rotation", "speed", "an impact", "a tempo of a swing", and "swing efficiency". Note that the "level" may be represented by scores such as "1, 2, 3, 4, and 5".

The swing analyzing device 20 causes the display 25 to display a swing diagnosis screen from information concerning the levels of the plurality of items and a total score. As an example of the swing diagnosis, the user 2 can grasp, with the swing diagnosis screen, the levels of the plurality of items and the total score as a diagnosis result for the input data. In particular, the user 2 can grasp, with the swing diagnosis screen, strong points and weak points about the swing of the user 2. The user 2 can also grasp, for example, which indicator should be improved to which degree in order to overcome the weak points.

1-2. Configurations of the Sensor Unit (the Exercise Measuring Device), the Swing Analyzing Device (the Exercise Analyzing Device), and the Wrist Device (the Exercise Measuring Device)

Figure 6:
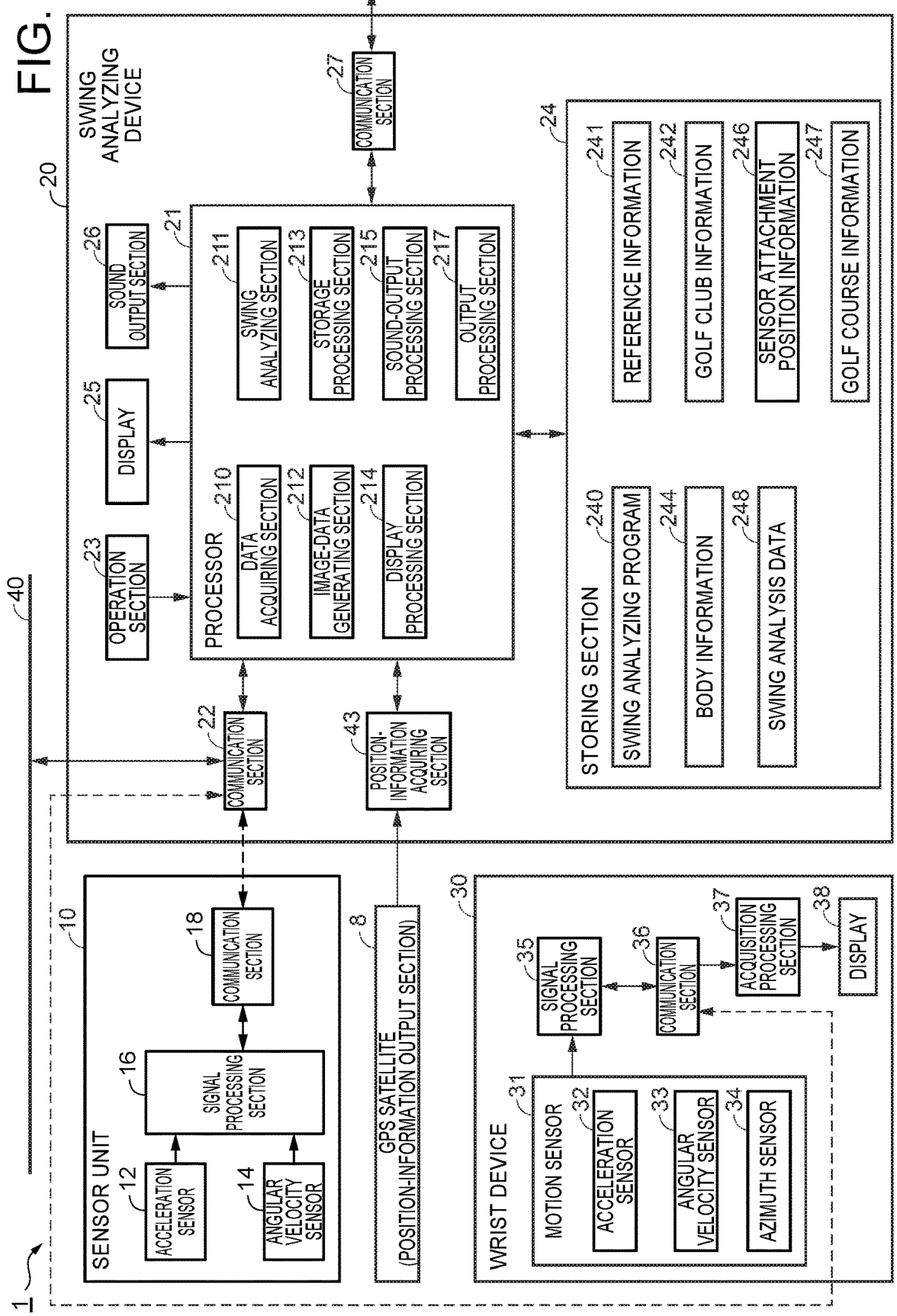
FIG. 6 is a diagram showing a configuration example of the sensor unit, the swing analyzing device, and the wrist device according to the first embodiment.

The sensor unit, the swing analyzing device functioning as the exercise analyzing device, and the wrist device configuring the swing analyzing system according to the first embodiment are explained with reference to FIG. 6. FIG. 6 is a diagram showing a configuration example of the sensor unit, the swing analyzing device, and the wrist device according to the first embodiment.

1-2-1. The Sensor Unit (the Exercise Analyzing Device)

The sensor unit 10 according to the first embodiment includes, as shown in FIG. 6, the inertial sensor (the acceleration sensor 12 and the angular velocity sensor 14), a signal processing section 16, and a communication section 18. However, the sensor unit 10 may have a configuration in which a part of the components are deleted or changed or other components are added as appropriate.

The acceleration sensor 12 functioning as the inertial sensor measures accelerations generated in respective three-axis directions crossing (ideally, orthogonal to) one another and outputs a digital signal (acceleration data) corresponding to the magnitudes and the directions of the measured accelerations in the respective three-axis directions.

The angular velocity sensor 14 functioning as the inertial sensor measures angular velocities generated around respective three axes crossing (ideally, orthogonal to) one another and outputs a digital signal (angular velocity data) corresponding to the magnitudes and the directions of the measured angular velocities around the respective three-axes.

The signal processing section 16 receives the acceleration data and the angular velocity data respectively from the acceleration sensor 12 and the angular velocity sensor 14, adds time data to the data, and stores the data in a not-shown storing section. The signal processing section 16 adds time information to the stored measurement data (the acceleration data and the angular velocity data), generates packet data adjusted to a format for communication, and outputs the packet data to the communication section 18.

The acceleration sensor 12 and the angular velocity sensor 14 are ideally attached to the sensor unit 10 such that the three axes respectively coincide with three axes (an x axis, a y axis, and a z axis) of an orthogonal coordinate system (a sensor coordinate system) defined with respect to the sensor unit 10. However, actually, an error of an attachment angle occurs. Therefore, the signal processing section 16 performs processing for converting the acceleration data and the angular velocity data into data of the xyz coordinate system using correction parameters calculated in advance according to the attachment angle error.

Note that the acceleration sensor 12 and the angular velocity sensor 14 may be sensors that output analog signals. In this case, the signal processing section 16 only has to perform A/D conversion of each of an output signal of the acceleration sensor 12 and an output signal of the angular velocity sensor 14 to generate measurement data (acceleration data and angular velocity data) and generate packet data for communication using these measurement data.

The communication section 18 performs processing for transmitting the packet data received from the signal processing section 16 to the swing analyzing device 20, processing for receiving various control commands such as a measurement start command from the swing analyzing device 20 and sending the control commands to the signal processing section 16, and the like. The signal processing section 16 performs various kinds of processing corresponding to the control commands.

1-2-2. The Swing Analyzing Device 20 (the Exercise Analyzing Device)

The swing analyzing device 20 according to the first embodiment includes, as shown in FIG. 6, a processor 21, a communication section 22, an operation section 23, a storing section 24, a display 25, a sound output section 26, a communication section 27, and the position-information acquiring section 43. However, the swing analyzing device 20 may have a configuration in which a part of these components are deleted or changed or other components are added as appropriate.

The communication section 22 performs processing for receiving packet data transmitted from the sensor unit 10 and sending the packet data to the processor 21, processing for transmitting a control command received from the processor 21 to the sensor unit 10, and the like. The communication section 22 performs processing for receiving course information including a course arrangement of a golf course via the network 40.

The operation section 23 performs processing for acquiring data corresponding to operation by the user 2 and sending the data to the processor 21. The operation section 23 may be, for example, a touch panel display, buttons, keys, or a microphone.

The storing section 24 is configured by, for example, various IC memories such as a ROM (Read Only Memory), a flash ROM, and a RAM (Random Access Memory) or a recording medium such as a hard disk or a memory card. The storing section 24 has stored therein computer programs for the processor 21 to perform various kinds of calculation processing and control processing, computer programs and data for realizing application functions, and the like.

In this embodiment, the storing section 24 has stored therein a swing analyzing program 240 read out by the processor 21 to execute swing analysis processing. The swing analyzing program 240 may be stored in advance in a nonvolatile recording medium (a computer readable recording medium). The processor 21 may receive the swing analyzing program 240 from a not-shown server via the network 40 and cause the storing section 24 to store the swing analyzing program 240.

In this embodiment, the storing section 24 has stored therein the reference information 241, golf club information 242, body information 244, sensor attachment position information 246, golf course information 247, and swing analysis data 248. For example, the user 2 may operate the operation section 23 to input specification information (e.g., at least a part of information such as the length of a shaft, the position of the center of gravity, a lie angle, a face angle, and a loft angle) of the golf club 3 in use from the input screen and set the input specification information as the golf club information 242. Alternatively, in step S1 in FIG. 4, the user 2 may input (or select from a model number list) a model number of the golf club 3 and set, as the golf club information 242, specification information of the input model number in specification information for each of model numbers stored in advance in the storing section 24.

For example, the user 2 may operate the operation section 23, input information related to the body from the input screen, and set the input information related to the body as the body information 244. For example, in step S1 in FIG. 4, the user 2 may operate the operation section 23 to input the distance between an attachment position of the sensor unit 10 and a grip end of the golf club 3 and set information concerning the input distance as the sensor attachment position information 246. Alternatively, assuming that the sensor unit 10 is attached to a predetermined position (e.g., a distance of 20 cm from the grip end), information concerning the predetermined position may be stored in advance as the sensor attachment position information 246. The user 2 may operate the operation section 23 and cause the storing section 24 to store, via the network 40, in advance, as the golf course information 247, information concerning a golf course where the user 2 plays.

The swing analysis data 248 is data including information concerning an analysis result of a swing motion by the processor 21 (a swing analyzing section 211) together with time (date and time) when a swing is performed, identification information and sex of the user 2, and a type of the golf club 3.

The storing section 24 is used as a work area of the processor 21. The storing section 24 temporarily stores data acquired by the operation section 23, results of an arithmetic operations executed by the processor 21 according to various computer programs, and the like. Further, the storing section 24 may store data that needs to be saved for a long period among data generated by processing of the processor 21, for example, the reference information 241 generated by the swing analyzing section 211, which functions as an analyzing section, as information obtained by analyzing a correlation or a similarity degree between outputs of the acceleration sensor 12 and the angular velocity sensor 14 included in the sensor unit 10 and outputs of the acceleration sensor 32 and the angular velocity sensor 33 included in the wrist device 30.

The display 25 displays a processing result of the processor 21 as characters, a graph, a table, an animation, or other images. The display 25 may be, for example, a CRT, an LCD, a touch panel display, or a head mounted display (HMD). Note that functions of the operation section 23 and the display 25 may be realized by one touch panel display.

First analysis information displayed on the display 25 desirably includes information related to at least one of an impact based on a relative face angle and a club path (an incident angle), efficiency based on a deceleration amount and timing in the grip 5 of the golf club 3, rotation based on a rotation angle and a face angle of a shaft axis during a top, head speed based on speed of the golf club 3 during ball hitting, and a tempo of a swing based on timings of an address start, a swing start, the top, and the impact. Note that analysis data of important indicators indicating real abilities (levels) concerning a plurality of swings is not limited to the above and may include indicators such as hand-up based on a lie angle during ball hitting and during address and down-blow based on a face angle and an attack angle. Consequently, the user 2 can obtain information related to at least one of an impact, a V zone, efficiency, rotation, head speed, and a tempo of a swing as the analysis data of the important indicators indicating the real abilities (the levels) concerning the plurality of swings.

The sound output section 26 outputs a processing result (analysis information) of the processor 21 to present the processing result as sound information such as voice or buzzer sound. The sound output section 26 may be, for example, a speaker or a buzzer.

The communication section 27 performs data communication between the communication section 27 and the other data processing devices (e.g., the swing diagnosing device) via the network 40. For example, after the end of the swing analysis processing, the communication section 27 performs processing for receiving the swing analysis data 248 from the processor 21 and transmitting the swing analysis data 248 to the swing diagnosing device.

For example, the position-information acquiring section 43 receives information related to positions included in radio waves (satellite signals) transmitted from the GPS satellites 8 functioning as position-information output sections, performs positioning calculation (acquisition of position information), and acquires (calculates) position information such as present position data of the swing analyzing device 20.

The processor 21 performs, according to various computer programs, processing for transmitting a control command to the sensor unit 10 via the communication section 22 and various kinds of calculation processing for data received from the sensor unit 10 via the communication section 22. The processor 21 performs, according to the various computer programs, processing for reading out the swing analysis data 248 from the storing section 24 and transmitting the swing analysis data 248 to the other data processing devices via the communication section 27. The processor 21 can output the swing analysis data 248 as image data corresponding to an image representing a calculated play state of the user 2.

The processor 21 can cause the storing section 24 to store, as the golf course information 247, a course arrangement, an altitude, and the like of the golf course input via the communication section 22. The processor 21 calculates position information of the user 2 on the basis of present position data sent from the position-information acquiring section 43 explained below. Note that the position information includes information such as a state of a movement and a moving track in a course of the user 2. The processor 21 performs other various kinds of control processing.

The processor 21 executes the swing analyzing program 240 to thereby function as a data acquiring section 210, a swing analyzing section 211 functioning as an analyzing section, an image-data generating section 212, a storage processing section 213, a display processing section 214, a sound-output processing section 215, and an output processing section 217. Note that the processor 21 includes a function of a computer.

The processor 21 executes the swing analyzing program 240 to thereby function as the data acquiring section 210 functioning as an acquiring section, the swing analyzing section 211, the image-data generating section 212, the storage processing section 213, the display processing section 214 functioning as an output section, the sound-output processing section 215 as an output section, and the output processing section 217. The processor 21 performs processing for analyzing a swing motion of the user 2 (swing analysis processing) and processing for calculating and outputting a play state indicating real states, strong points, and weak points of motions including a golf swing and movement of the user 2.

The data acquiring section 210 functioning as an acquiring section performs processing for receiving packet data received by the communication section 22 from the sensor unit 10 and the wrist device 30, acquiring time information and measurement data from the received packet data, and sending the time information and the measurement data to the storage processing section 213. The data acquiring section 210 performs processing for receiving information necessary for display of various screens received by the communication section 27 from the other data processing devices and sending the information to the image-data generating section 212.

The storage processing section 213 performs processing for reading and writing various computer programs and various data from and in the storing section 24. For example, the storage processing section 213 performs processing for causing the storing section 24 to store time information and measurement data received from the data acquiring section 210 in association with each other and processing for causing the storing section 24 to store various kinds of information calculated by the swing analyzing section 211, the swing analysis data 248, and the like.

The swing analyzing section 211 functioning as an analyzing section performs processing for analyzing a swing motion (a plurality of swings) of the user 2 using measurement data output by the sensor unit 10 (measurement data stored in the storing section 24), data received from the operation section 23, and the like and generating the swing analysis data 248 as first analysis information including information concerning time (date and time) when a swing is performed, identification information and sex of the user 2, a type of the golf club 3, and an analysis result of the swing motion. In particular, in this embodiment, the swing analyzing section 211 calculates values of respective indicators of a swing of golf as at least a part of information concerning an analysis result of the swing motion. Note that the swing analysis data 248 serving as the first analysis information includes information related to at least one of an impact, a V zone, efficiency (swing efficiency), rotation, head speed, and a tempo of a swing.

The swing analyzing section 211 can calculate, as indicators of a swing, indicators explained below. However, the swing analyzing section 211 may not calculate values of a part of the indicators as appropriate or may calculate values of other indicators.

(1) A "shaft plane SP" and a "Hogan plane HP" that are indicators indicating at least one imaginary plane.

(2) A "position of the head 3a during halfway back" that is an indicator indicating the position of the head 3a at first timing during a back swing or at second timing during a down swing.

(3) A "head speed" that is an indicator based on an incident angle and a tilt of the head 3a at an impact (during ball hitting) or an indicator based on the speed of the head 3a.

(4) A "shaft axis rotation angle during a top" that is an indicator based on a rotation angle around a rotation axis (hereinafter referred to as around a long axis) of the shaft of the golf club 3 at predetermined timing from the start of the back swing until the impact (the ball hitting) with the longitudinal direction of the shaft set as the rotation axis.

(5) A "grip deceleration ratio" also called "natural uncock" or "natural uncock ratio" that is an indicator based on a deceleration amount of the grip 5 of the golf club 3 in the down swing.

(6) An indicator "grip deceleration time ratio" based on a deceleration period of the grip 5 and timing of the natural uncock ("natural release timing") that is an indicator based on deceleration timing of the grip 5 in the golf club 3 in the down swing. Note that the timing of the natural uncock is an indicator indicating timing of switching in a state in which energy accumulated in the top swing is switched to release and transmitted to the golf club 3.

(7) An indicator related to the position of the head 3a during the halfway back (HWB) and an indicator related to the position of the head 3a during the halfway down (HWD) in a region between the shaft plane SP (a first imaginary plane) and the Hogan plane HP (a second imaginary plane) called "V zone".

(8) An indicator based on a "lie angle" during ball hitting and a "lie angle" or a "face angle" and an "attack angle" during address in the head 3a of the golf club 3.

Note that the swing-analyzing section 211 functioning as an analyzing section performs processing for generating, as the reference information 241, correspondence information obtained by analyzing a correlation or a similarity degree between outputs of the acceleration sensor 12 and the angular velocity sensor 14 functioning as the second inertial sensor included in the sensor unit 10 and outputs of the acceleration sensor 32 and the angular velocity sensor 33 functioning as the first inertial sensor included in the wrist device 30, sending the reference information 241 to the storage processing section 213, and saving (storing) the reference information 241 in the storing section 24. Note that, for the generation of the reference information 241, outputs of the inertial sensors at timings of the motions (e.g., the swing start, the halfway back, the top, and the impact) related to the swing motion of the user 2 are used. The reference information 241 may be the reference information 241 at the timings of the motions.

In the generation of the reference information 241, the swing analyzing section 211 may calculate an analysis value in the grip 5 of the golf club 3 from each of the outputs of the acceleration sensor 32 and the angular velocity sensor 33 and the outputs of the acceleration sensor 12 and the angular velocity sensor 14 and generate the reference information 241 on the basis of the analysis value.

In this way, the reference information 241 in the grip 5, which is a joint section of both of the body to which the wrist device 30 is attached and the golf club 3 to which the sensor unit 10 is attached, is generated and used for an analysis. Therefore, it is possible to perform a more highly accurate swing analysis.

The image-data generating section 212 performs processing for generating image data corresponding to an image displayed on the display 25. For example, the image-data generating section 212 generates image data corresponding to the selection screen, the input data editing screen, and the swing diagnosis screen on the basis of the various kinds of information received by the data acquiring section 210.

The display processing section 214 functioning as the output section performs processing for causing the display 25 to display various images (including characters and signs besides the image corresponding to the image data generated by the image-data generating section 212). For example, the display processing section 214 causes, on the basis of the image data generated by the image-data generating section 212, the display 25 to display the selection screen, the input data editing screen, the swing diagnosis screen, and the like. For example, in step S5 in FIG. 4, the image-data generating section 212 may cause the display 25 to display an image, characters, or the like for notifying permission of a start of a swing to the user 2. For example, the display processing section 214 may output, as display data, a swing analysis result of an analysis of a swing analyzed by outputs of the second inertial sensor (the acceleration sensor 12 and the angular velocity sensor 14) of the sensor unit 10 estimated by the output processing section 217 explained below and cause the display 25 to display the display data. For example, after the swing motion of the user 2 ends, the display processing section 214 may cause, automatically or according to input operation of the user 2, the display 25 to display text information such as characters or signs indicating a result of an analysis by the swing analyzing section 211. Alternatively, a display 38 may be provided in the wrist device 30. The display processing section 214 may transmit image data to the wrist device 30 via the communication section 22 and cause the display 38 to display various images, characters, and the like.

The sound-output processing section 215 functioning as an output section performs processing for causing the sound output section 26 to output various kinds of sound (including voice and buzzer sound). For example, in step S5 in FIG. 4, the sound-output processing section 215 may cause the sound output section 26 to output sound for notifying permission of a start of a swing to the user 2. For example, the sound-output processing section 215 may output, as voice information, a swing analysis result of a swing analyzed by outputs of the second inertial sensor (the acceleration sensor 12 and the angular velocity sensor 14) of the sensor unit 10 estimated by the output processing section 217 explained below. For example, after the swing motion of the user 2 ends, the sound-output processing section 215 may cause, automatically or according to input operation of the user 2, the sound output section 26 to output sound or voice indicating a result of an analysis by the swing analyzing section 211. Alternatively, a sound output section may be provided in the sensor unit 10 or the wrist device 30. The sound-output processing section 215 may transmit various sound data or voice data to the sensor unit 10 or the wrist device 30 via the communication section 22 and cause the sound output section to output various kinds of sound or voice.

In this way, the swing analysis result of the swing analyzed by the outputs of the second inertial sensor (the acceleration sensor 12 and the angular velocity sensor 14) of the sensor unit 10 estimated by the output processing section 217 explained below is output from the display processing section 214 or the sound-output processing section 215 functioning as the output section. Therefore, the user 2 can easily grasp an exercise analysis result.

Note that a vibrating mechanism may be provided in the swing analyzing device 20, the sensor unit 10, or the wrist device 30. Various kinds of information may be converted into vibration information by the vibrating mechanism and notified to the user 2.

When the sensor unit 10 is not used during round or the like, the output processing section 217 performs processing for estimating outputs of the second inertial sensor (the acceleration sensor 12 and the angular velocity sensor 14) of the sensor unit 10 from outputs of the first inertial sensor (the acceleration sensor 32 and the angular velocity sensor 33) of the wrist device 30 and the reference information 241 stored (saved) in the storing section 24.

The output processing section 217 may calculate an average of a plurality of kinds of reference information 241 generated for each of a plurality of swings and estimate outputs of the second inertial sensor (the acceleration sensor 12 and the angular velocity sensor 14) of the sensor unit 10 from the average of the reference information 241. In this way, the outputs of the second inertial sensor (the acceleration sensor 12 and the angular velocity sensor 14) of the sensor unit 10 are estimated from the average of the plurality of kinds of reference information 241. Therefore, it is possible to improve accuracy of a swing analysis.

1-2-3. The Wrist Device (the Exercise Measuring Device)

The wrist device 30 according to the first embodiment includes, as shown in FIG. 6, a motion sensor 31 including the inertial sensor (the acceleration sensor 32 and the angular velocity sensor 33) and an azimuth sensor 34, a signal processing section 35, a communication section 36, an acquisition processing section 37, and the display 38. However, the wrist device 30 may have a configuration in which a part of the components are deleted or changed or other components are added as appropriate.

The acceleration sensor 32 functioning as the inertial sensor measures accelerations generated in respective three-axis directions crossing (ideally, orthogonal to) one another and outputs a digital signal (acceleration data) corresponding to the magnitudes and the directions of the measured accelerations in the respective three-axis directions.

The angular velocity sensor 33 functioning as the inertial sensor measures angular velocities generated around respective three axes crossing (ideally, orthogonal to) one another and outputs a digital signal (angular velocity data) corresponding to the magnitudes and the directions of the measured angular velocities around the respective three-axes.

The azimuth sensor 34 can indicate a direction in which the azimuth sensor 34 faces. That is, the azimuth sensor 34 can detect a direction in which the user 2 faces, a direction in which the user 2 moves, and the like and output the directions. The azimuth sensor 34 can measure, for example, the direction of a magnetic field in terrestrial magnetism and perform arithmetic processing of the measured direction of the magnetic field to thereby acquire azimuth information (one kind of position information) related to the user 2. Note that the azimuth sensor 34 is sometimes called terrestrial magnetism sensor.

The signal processing section 35 receives the acceleration data, the angular velocity data, and the azimuth data respectively from the acceleration sensor 32, the angular velocity sensor 33, and the azimuth sensor 34, adds time information to the data, and stores the data in a not-shown storing section. The signal processing section 35 adds time information to the stored measurement data (the acceleration data, the angular velocity data, and the azimuth data), generates packet data adjusted to a format for communication, and outputs the packet data to the communication section 36.

Note that the acceleration sensor 32 and the angular velocity sensor 33 may be sensors that output analog signals. In this case, the signal processing section 35 only has to perform A/D conversion of each of an output signal of the acceleration sensor 32 and an output signal of the angular velocity sensor 33 to generate measurement data (acceleration data and angular velocity data) and generate packet data for communication using these measurement data.

The communication section 36 performs processing for transmitting the packet data received from the signal processing section 35 to the swing analyzing device 20, processing for receiving various control commands such as a measurement start command from the swing analyzing device 20 and sending the control commands to the signal processing section 35, and the like. The communication section 36 performs, for example, processing for receiving an analysis result of a swing from the swing analyzing device 20 and sending the analysis result to the acquisition processing section 37. The signal processing section 35 performs various kinds of processing corresponding to the control commands.

The acquisition processing section 37 performs processing for acquiring, via the communication section 36, a swing analysis result of a swing analyzed by the swing analyzing device 20 and causing the display 38 to display images (including characters and signs besides the images) representing various analysis results.

The display 38 displays a processing result of the acquisition processing section 37 for the swing analysis result as characters, a graph, a table, an animation, or other images. The display 25 can be configured by, for example, a liquid crystal display (LCD).

1-3. An Exercise Analyzing Method (a Swing Analyzing Method)

Figure 7:
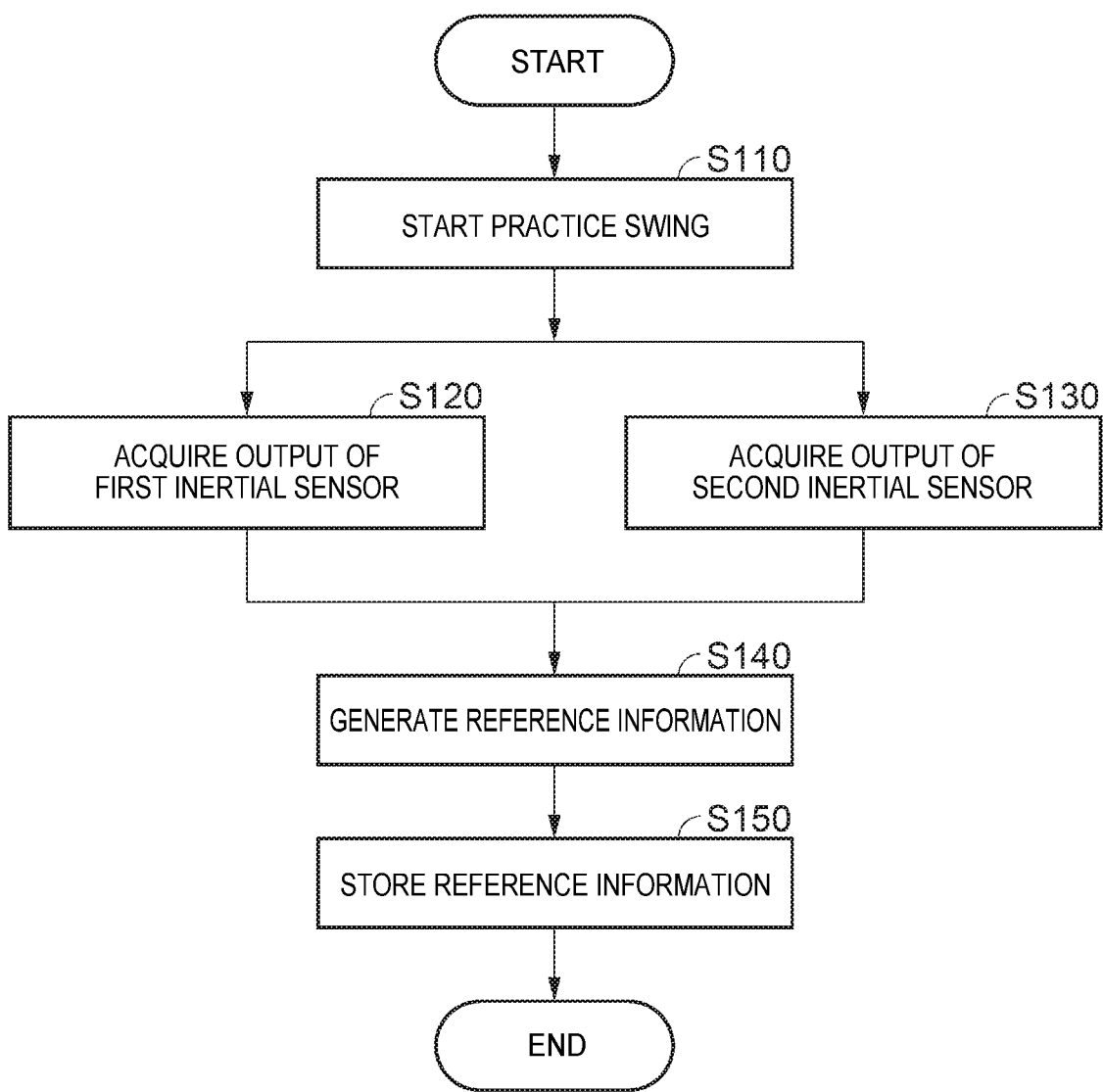
FIG. 7 is a flowchart for explaining a procedure for acquiring reference information.
Figure 8:
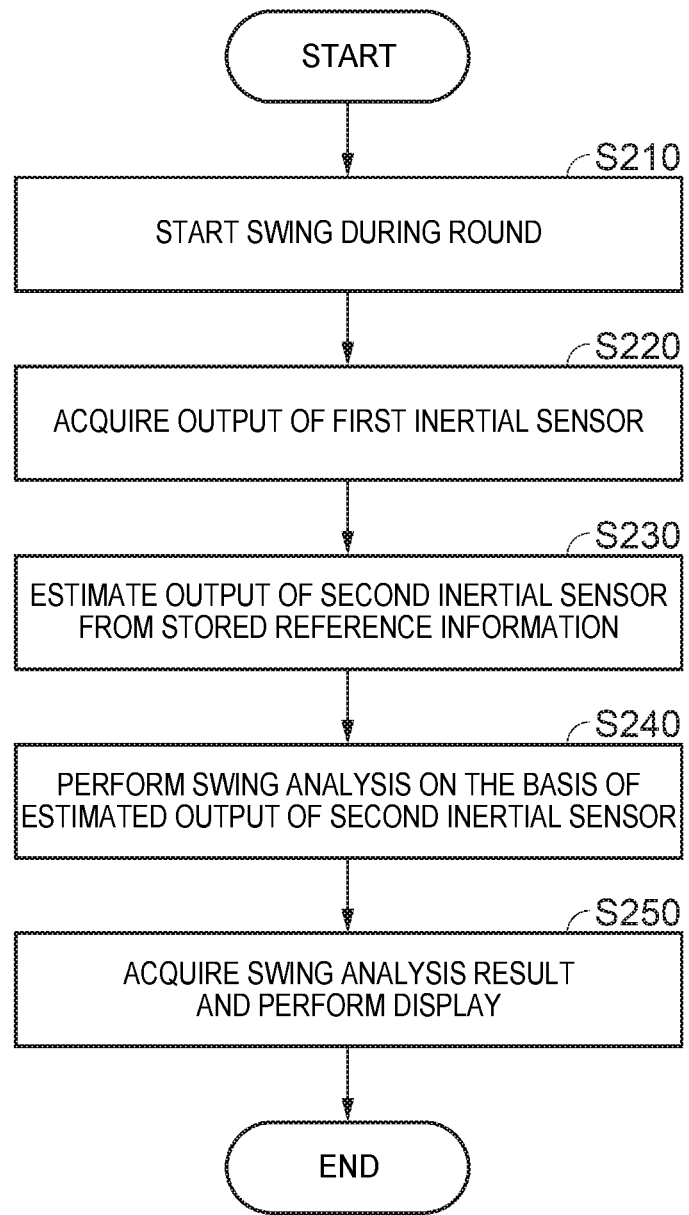
FIG. 8 is a flowchart for explaining a procedure of an exercise analyzing method in which the reference information is used.

A procedure related to a swing analyzing method functioning as an exercise measuring method is explained with reference to FIGS. 7 and 8. FIG. 7 is a flowchart for explaining a procedure for acquiring reference information. FIG. 8 is a flowchart for explaining a procedure of an exercise analyzing method in which the reference information is used. The processor 21 explained above executes the swing analyzing program 240 stored in the storing section 24 to thereby execute swing analysis processing. The swing analysis processing is explained below according to the flowcharts of FIGS. 7 and 8. Note that, in the following explanation, the components configuring the exercise analyzing system 1 explained above are denoted by the same reference numerals and signs.

First, a procedure for, for example, during practice, attaching the sensor unit 10 and the wrist device 30 to respective attachment parts, performing a swing, and acquiring the reference information 241 is explained with reference to FIG. 7.

In a practice range, the user 2 attaches the sensor unit 10 to the golf club 3 and attaches the wrist device 30 to the body (e.g., the wrist) of the user 2. The user 2 grips the golf club 3 to which the sensor unit 10 is attached and starts a practice swing (step S110).

According to the swing, outputs detected by the acceleration sensor 32 and the angular velocity sensor 33 functioning as the first inertial sensor included in the wrist device 30 are acquired (step S120) and outputs detected by the acceleration sensor 12 and the angular velocity sensor 14 functioning as the second inertial sensor included in the sensor unit 10 are acquired (step S130). The acquired outputs of both the inertial sensors are sent to the swing analyzing device 20.

The processor 21 (the swing analyzing section 211) of the swing analyzing device 20 analyzes a correlation or a similarity degree between the acquired outputs of the acceleration sensor 32 and the angular velocity sensor 33 functioning as the first inertial sensor and the acquired outputs of the acceleration sensor 12 and the angular velocity sensor 14 functioning as the second inertial sensor and generates the reference information 241 serving as correlation information of outputs in the first inertial sensor and the second inertial sensor (step S140).

The processor 21 (the swing analyzing section 211) sends the generated reference information 241 to the storage processing section 213. The storage processing section 213 performs processing for saving (storing) the received reference information 241 in the storing section 24 (step S150). According to the procedure explained above, a series of procedures for acquiring the reference information 241 during the practice is ended.

A procedure for performing an exercise analysis using the reference information 241, for example, when the user 2 plays round in a golf course in a state in which the sensor unit 10 is not attached to the golf club 3 and the wrist device 30 is attached to the wrist is explained with reference to FIG. 8. Note that "the sensor unit 10 is not attached to the golf club 3" is equivalent to "the second inertial sensor (the acceleration sensor 12 and the angular velocity sensor 14) is not used".

First, the user 2 attaches the wrist device 30 to the body, for example, the wrist of the user 2. The user 2 starts a swing in round with the golf club 3 (step S210).

According to the swing, outputs detected by the acceleration sensor 32 and the angular velocity sensor 33 functioning as the first inertial sensor included in the wrist device 30 are acquired (step S220). The acquired outputs of the first inertial sensor are sent to the swing analyzing device 20.

The processor 21 (the output processing section 217) of the swing analyzing device 20 estimates, on the basis of the acquired outputs of the first inertial sensor (the acceleration sensor 32 and the angular velocity sensor 33), from the reference information 241 stored in the storing section 24, not-measured outputs of the second inertial sensor (the acceleration sensor 12 and the angular velocity sensor 14) of the sensor unit 10 (not attached) that should be attached to the golf club 3 (step S230).

The processor 21 (the swing analyzing section 211) performs a swing analysis in the swing on the basis of the outputs of the second inertial sensor (the acceleration sensor 12 and the angular velocity sensor 14) estimated from the reference information 241 (step S240) and sends an analysis result to the image-data generating section 212.

The image-data generating section 212 performs processing for generating image data related to the analysis result and sends the image data to the display processing section 214 functioning as the output section. The display processing section 214 performs processing for causing the display 25 to display various images (including characters and signs besides an image corresponding to the image data generated by the image-data generating section 212) and displays an analysis result of the swing on the display 25 (step S250). According to the procedure explained above, a series of procedures of the swing analyzing method during the round is ended.

With the exercise analyzing system 1 including the sensor unit 10, the swing analyzing device 20 functioning as the exercise analyzing device, and the wrist device 30 according to the first embodiment explained above, for example, during practice, the swing analyzing section 211 generates the reference information 241 obtained by analyzing a correlation or a similarity degree between outputs of the first inertial sensor (the acceleration sensor 32 and the angular velocity sensor 33) included in the wrist device 30 attached to the body (e.g., the wrist) of the user 2 and outputs of the second inertial sensor (the acceleration sensor 12 and the angular velocity sensor 14) included in the sensor unit 10 attached to the exercise instrument (the golf club 3), the outputs being acquired by the data acquiring section 210 functioning as the acquiring section included in the swing analyzing device 20. When the sensor unit 10 (the second inertial sensor) is not used, the swing analyzing section 211 estimates, on the basis of outputs of the first inertial sensor (the acceleration sensor 32 and the angular velocity sensor 33) included in the wrist device 30 used at that time, outputs of the second inertial sensor (the acceleration sensor 12 and the angular velocity sensor 14) corresponding to the outputs of the first inertial sensor from the reference information 241 during practice and performs an analysis of a swing according to the estimated outputs of the second inertial sensor (the acceleration sensor 12 and the angular velocity sensor 14). Consequently, when the sensor unit 10 (the second inertial sensor) is not used, for example, during golf round, even if the sensor unit 10 is not attached to the golf club 3 or the like, it is possible to perform an swing analysis with relatively high accuracy according to the estimated outputs of the second inertial sensor (the acceleration sensor 12 and the angular velocity sensor 14). It is possible to improve convenience, that is, convenience of use for the user 2.

Second Embodiment 2-1. Configuration of an Exercise Analyzing System

Figure 9:
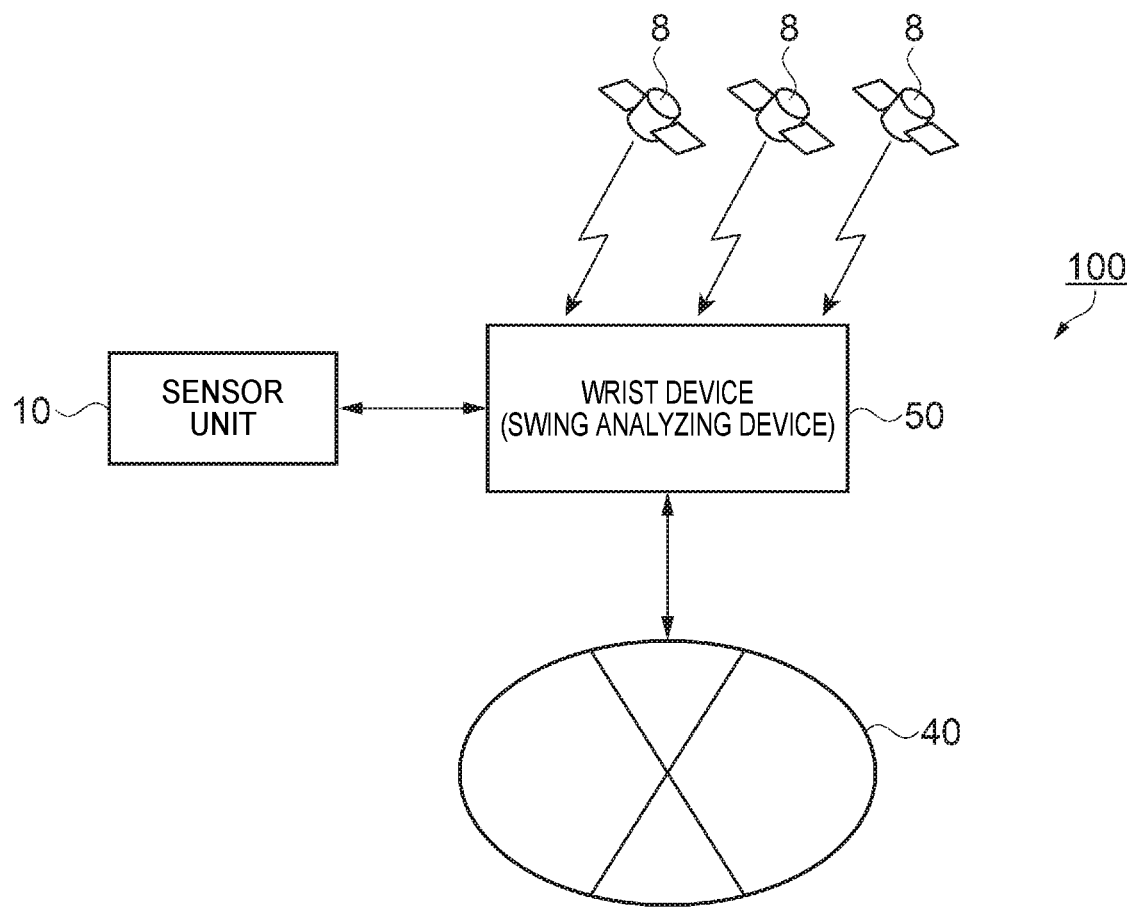
FIG. 9 is a diagram showing a configuration example of an exercise analyzing system according to a second embodiment.
Figure 10:
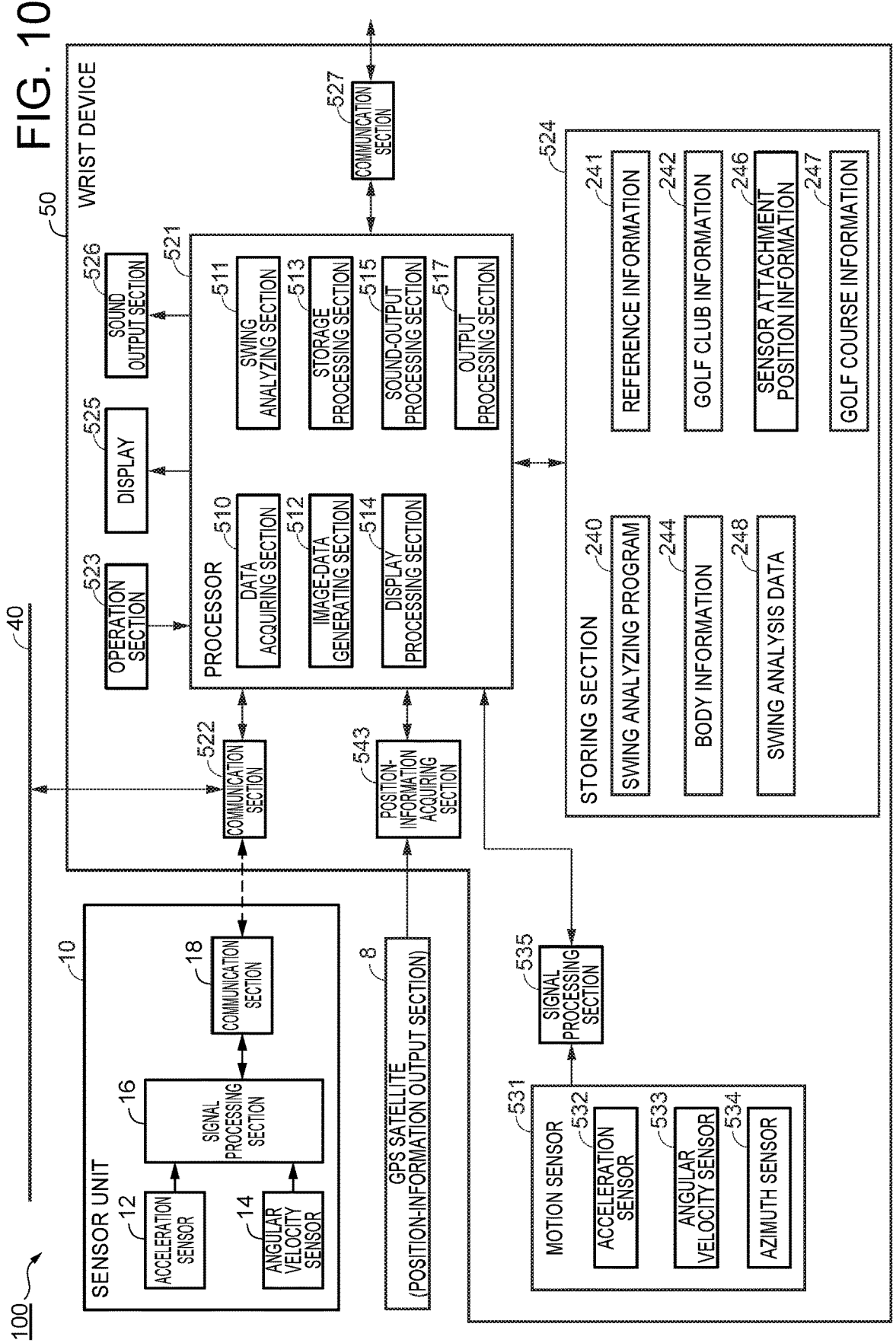
FIG. 10 is a diagram showing a disposition example of a sensor unit functioning as an exercise measuring device and a wrist device functioning as an exercise analyzing device according to the second embodiment.

An exercise analyzing system (a wrist device functioning as an exercise analyzing device) according to a second embodiment is explained with reference to FIGS. 9 and 10 and with reference to, as an example of exercise measurement and an exercise analysis, measurement and an analysis of a swing of golf (hereinafter referred to as golf swing). FIG. 9 is a diagram showing a configuration example of the exercise analyzing system according to the second embodiment. FIG. 10 is a diagram showing a disposition example of a sensor unit functioning as an exercise measuring device and a wrist device functioning as an exercise analyzing device according to the second embodiment.

As shown in FIG. 9, an exercise analyzing system 100 in the second embodiment includes the sensor unit 10 functioning as an exercise measuring device and a wrist device 50 functioning as an exercise analyzing device. Note that, in the exercise analyzing system 1 according to the first embodiment, the swing analyzing device 20 and the wrist device 30 are separately configured. However, in this embodiment, both of the swing analyzing device 20 and the wrist device 30 are included in the wrist device 50 functioning as the swing analyzing device. As shown in FIG. 9, the exercise analyzing system 100 includes the GPS satellites (the position-information output sections) 8 and a position-information acquiring section 543 (see FIG. 10) included in the wrist device (the swing analyzing device) 50. The exercise analyzing system 100 can include a function of receiving information related to positions included in radio waves (satellite signals) transmitted from the GPS satellites 8 and performing measurement calculation (acquisition of position information). In the following explanation, the same components as the components in the first embodiment such as the sensor unit 10 are denoted by the same reference numerals and signs and explanation of the components is omitted.

However, the exercise analyzing system 100 may include a not-shown swing diagnosing device separately from the wrist device 50. The swing diagnosing device in that case may be realized by a server that processes a request received from the wrist device 50. The wrist device 50 and the swing diagnosing device may be connected via the network 40. The network 40 may be a wide area network (WAN) such as the Internet or may be a local area network (LAN). Alternatively, the wrist device 50 and the swing diagnosing device may communicate, for example, through short-range wireless communication or wired communication not via the network 40.

2-2. Configuration of the Swing Analyzing Device (the Wrist Device)

The wrist device (the swing analyzing device) functioning as the exercise analyzing device according to the second embodiment is explained with reference to FIG. 10. The wrist device 50 according to the second embodiment includes, as shown in FIG. 10, a motion sensor 531 including an inertial sensor (an acceleration sensor 532 and an angular velocity sensor 533) and an azimuth sensor 534, a signal processing section 535, a processor 521, a communication section 522, an operation section 523, a storing section 524, a display 525, a sound output section 526, a communication section 527, and a position-information acquiring section 543. However, the wrist device 50 may have a configuration in which a part of these components are deleted or changed or other components are added as appropriate.

The acceleration sensor 532 functioning as the inertial sensor measures accelerations generated in respective three-axis directions crossing (ideally, orthogonal to) one another and outputs a digital signal (acceleration data) corresponding to the magnitudes and the directions of the measured accelerations in the respective three-axis directions.

The angular velocity sensor 533 functioning as the inertial sensor measures angular velocities generated around respective three axes crossing (ideally, orthogonal to) one another and outputs a digital signal (angular velocity data) corresponding to the magnitudes and the directions of the measured angular velocities around the respective three-axes.

The azimuth sensor 534 can indicate a direction in which the azimuth sensor 534 faces. That is, the azimuth sensor 534 can detect a direction in which the user 2 faces, a direction in which the user 2 moves, and the like and output the directions. The azimuth sensor 534 can measure, for example, the direction of a magnetic field in terrestrial magnetism and perform arithmetic processing of the measured direction of the magnetic field to thereby acquire azimuth information (one kind of position information) related to the user 2. Note that the azimuth sensor 534 is sometimes called terrestrial magnetism sensor.

The signal processing section 535 receives the acceleration data, the angular velocity data, and the azimuth data respectively from the acceleration sensor 532, the angular velocity sensor 533, and the azimuth sensor 534, generates measurement data (acceleration data, angular velocity data, and azimuth data) to which time information is added, and outputs the measurement data to the processor 521.

Note that the processor 521, the communication section 522, the operation section 523, the storing section 524, the display 525, the sound output section 526, the communication section 527, and the position-information acquiring section 543 are respectively the same as the processor 21, the communication section 22, the operation section 23, the storing section 24, the display 25, the sound output section 26, the communication section 27, and the position-information acquiring section 43 in the first embodiment. Therefore, explanation of the sections is omitted below. In this embodiment, a display processing section 514 functions as an acquisition processing section.

With the exercise analyzing system 100 including the wrist device (the swing analyzing device) 50 functioning as the exercise analyzing device according to the second embodiment explained above, in the wrist device 50, as in the first embodiment, the data analyzing section (the swing analyzing section 211) generates the reference information 241 obtained by analyzing a correlation or a similarity degree between outputs of the first inertial sensor (the acceleration sensor 32 and the angular velocity sensor 33) attached to the body (e.g., the wrist) of the user 2 and outputs of the second inertial sensor (the acceleration sensor 12 and the angular velocity sensor 14) included in the sensor unit 10 attached to the exercise instrument (the golf club 3), the outputs being acquired, for example, during practice. When the sensor unit 10 (the second inertial sensor) is not used, the data analyzing section (the swing analyzing section 211) estimates, on the basis of outputs of the first inertial sensor (the acceleration sensor 32 and the angular velocity sensor 33) included in the wrist device 50 used at that time, outputs of the second inertial sensor (the acceleration sensor 12 and the angular velocity sensor 14) corresponding to the outputs of the first inertial sensor from the reference information 241 during practice and performs an analysis of a swing according to the estimated outputs of the second inertial sensor (the acceleration sensor 12 and the angular velocity sensor 14). Consequently, when the sensor unit 10 (the second inertial sensor) is not used, for example, during golf round, even if the sensor unit 10 is not attached to the golf club 3 or the like, it is possible to perform a swing analysis with relatively high accuracy according to the outputs of the second inertial sensor (the acceleration sensor 12 and the angular velocity sensor 14) estimated by the wrist device 50. It is possible to improve convenience, that is, convenience of use for the user 2.

Note that, in the exercise analyzing system 100 and the wrist device 50 (the swing analyzing device) according to the second embodiment explained above, it is possible to apply the procedure related to the exercise measuring method (the swing analyzing method).

In the above explanation, the GPS in which the GPS satellites 8 are used as the position information satellites included in the global navigation satellite system (GNSs) is illustrated. This is only an example. The global navigation satellite system only has to be other systems such as GALILEO (EU), GLONASS (Russia), and BeiDou (China) or global navigation satellite systems including position information satellites that transmit satellite signals such as geostationary satellites, for example, SBAS, and quasi-zenith satellites. Note that the global navigation satellite system can be a regional navigation satellite system (RNSS).

The invention includes configurations substantially the same as the configurations explained in the embodiments (e.g., configurations having the same functions, methods, and results or configurations having the same objects and effects). The invention includes configurations in which unessential portions of the configurations explained in the embodiments are replaced. The invention includes configurations that realize the same action and effects as the action and the effects of the configurations explained in the embodiments or configurations that can achieve the objects as the objects of the configurations explained in the embodiments. The invention includes configurations obtained by adding publicly-known techniques to the configurations explained in the embodiments.

What is claimed is:

1. An exercise analyzing device comprising a processor configured to process an output of a first inertial sensor attached to a user and an output of a second inertial sensor attached to an exercise instrument, the processor including functions of:
an acquiring section configured to acquire the output of the first inertial sensor and the output of the second inertial sensor;
an analyzing section configured to analyze a correlation or a similarity degree between the output of the first inertial sensor and the output of the second inertial sensor and generate reference information; and
an output processing section configured to estimate, when the second inertial sensor is not used, the output of the second inertial sensor from the output of the first inertial sensor and the reference information.

2. The exercise analyzing device according to claim 1, wherein the processor functioning as the analyzing section calculates an analysis value in a grip of the exercise instrument from each of the output of the first inertial sensor and the output of the second inertial sensor and generates the reference information from the analysis value.

3. The exercise analyzing device according to claim 1, wherein the processor functioning as the output processing section estimates an average of a plurality of kinds of the reference information as the output of the second inertial sensor.

4. The exercise analyzing device according to claim 1, wherein the processor includes a function of an output section configured to output an exercise analysis result obtained by analyzing exercise on the basis of the output of the second inertial sensor assumed by the processor functioning as the output processing section.

5. An exercise analyzing system comprising:
a wrist device attached to a user and including a first inertial sensor;
a sensor unit attached to an exercise instrument and including a second inertial sensor; and
an exercise analyzing device including a processor configured to process an output of the first inertial sensor and an output of the second inertial sensor,
the processor includes functions of:
an acquiring section configured to acquire the output of the first inertial sensor and the output of the second inertial sensor;
an analyzing section configured to analyze a correlation or a similarity degree between the output of the first inertial sensor and the output of the second inertial sensor and generate reference information; and
an output processing section configured to estimate, when the sensor unit is not used, the output of the second inertial sensor from the output of the first inertial sensor and the reference information.

6. An exercise analyzing system comprising:
a sensor unit attached to an exercise instrument and including a second inertial sensor; and
a wrist device attached to a user and including a first inertial sensor and a processor configured to process an output of the first inertial sensor and an output of the second inertial sensor,
the processor including functions of:
an acquiring section configured to acquire the output of the first inertial sensor and the output of the second inertial sensor;
an analyzing section configured to analyze a correlation or a similarity degree between the output of the first inertial sensor and the output of the second inertial sensor and generate reference information; and
an output processing section configured to estimate, when the sensor unit is not used, the output of the second inertial sensor from the output of the first inertial sensor and the reference information.

7. The exercise analyzing system according to claim 5, wherein the wrist device includes:
a processor functioning as an acquisition processing section configured to acquire the exercise analysis result; and
a display configured to display the exercise analysis result acquired by the acquisition processing section.

8. The exercise analyzing system according to claim 6, wherein the wrist device includes:
a processor functioning as an acquisition processing section configured to acquire the exercise analysis result; and
a display configured to display the exercise analysis result acquired by the acquisition processing section.

9. An exercise analyzing method comprising:
acquiring an output of a first inertial sensor attached to a user;
acquiring reference information obtained by analyzing a correlation or a similarity degree between the output of the first inertial sensor and an output of a second inertial sensor attached to an exercise instrument; and
estimating, when the second inertial sensor is not used, the output of the second inertial sensor from the output of the first inertial sensor and the reference information.

* * * * *